(12) United States Patent
Tiberghien et al.

(10) Patent No.: US 11,098,831 B2
(45) Date of Patent: Aug. 24, 2021

(54) FLUID COUPLING

(71) Applicant: STAUBLI FAVERGES, Faverges-Seythenex (FR)

(72) Inventors: Alain-Christophe Tiberghien, Sevrier (FR); Christophe Durieux, Gilly sur Isere (FR); Serafim Marques Barroca, Frontenex (FR)

(73) Assignee: STAUBLI FAVERGES, Faverges-Seythenex (FR)

( * ) Notice: Subject to any disclaimer, the term of this patent is extended or adjusted under 35 U.S.C. 154(b) by 0 days.

(21) Appl. No.: 17/029,168

(22) Filed: Sep. 23, 2020

(65) Prior Publication Data
US 2021/0095805 A1   Apr. 1, 2021

(30) Foreign Application Priority Data

Sep. 30, 2019  (FR) ...................................... 1910792

(51) Int. Cl.
*F16L 29/04* (2006.01)
*F16L 37/30* (2006.01)
*F16L 37/32* (2006.01)
*F16L 37/34* (2006.01)
*F16L 37/413* (2006.01)

(52) U.S. Cl.
CPC .............. *F16L 29/04* (2013.01); *F16L 37/30* (2013.01); *F16L 37/32* (2013.01); *F16L 37/34* (2013.01); *F16L 37/413* (2013.01)

(58) Field of Classification Search
CPC .......... F16L 29/04; F16L 37/34; F16L 37/413
See application file for complete search history.

(56) References Cited

U.S. PATENT DOCUMENTS

| | | | | |
|---|---|---|---|---|
| 2,254,997 A | * | 9/1941 | Fisher | F16L 29/04 137/614.03 |
| 2,319,015 A | * | 5/1943 | Speth | F16L 29/04 137/614.03 |
| 2,416,967 A | * | 3/1947 | Percival | F16L 29/04 137/614.03 |

(Continued)

FOREIGN PATENT DOCUMENTS

| | | |
|---|---|---|
| CN | 205896502 U | 1/2017 |
| GB | 2068069 A | 8/1981 |
| WO | 97/13095 A1 | 4/1997 |

OTHER PUBLICATIONS

Search Report for French Application 1910792, dated Jan. 31, 2020, 2 pages.

*Primary Examiner* — David Colon-Morales

(57) ABSTRACT

A fluid coupling includes a male element and a female element, which has a gear reduction member and a main body defining a main inner channel, a plunger, and a slide valve movable between a closed configuration and an open configuration. The slide valve has an outer slide valve and an inner slide valve. In the closed configuration, the outer slide valve is in a forward position and the inner slide valve is in a forward position contacting the outer slide valve and the plunger. In the open configuration, the outer slide valve is in a withdrawn position and the inner slide valve is in an offset position. The gear reduction member is disengaged from a front stop surface on the main body, a rear stop surface on the outer slide valve, or a front stop surface on the inner slide valve during a coupling phase.

16 Claims, 10 Drawing Sheets

(56) References Cited

U.S. PATENT DOCUMENTS

| | | | | |
|---|---|---|---|---|
| 2,441,363 A * | 5/1948 | Krueger | H01R 13/62 | 285/304 |
| 2,456,045 A * | 12/1948 | Brock | F16L 29/04 | 137/614.03 |
| 3,039,794 A * | 6/1962 | De Cenzo | F16L 37/1215 | 137/614.03 |
| 3,367,366 A * | 2/1968 | Klatte | F16L 37/35 | 137/614.05 |
| 3,706,318 A * | 12/1972 | Baniadam | F16L 29/04 | 137/614.03 |
| 3,871,404 A * | 3/1975 | Courant | F16L 37/34 | 137/614.03 |
| 4,219,048 A * | 8/1980 | Ekman | F16L 37/23 | 137/614.03 |
| 4,429,713 A * | 2/1984 | Walter | F16L 37/23 | 137/614.03 |
| 5,988,697 A * | 11/1999 | Arosio | F16L 37/23 | 285/124.1 |
| 6,179,001 B1 * | 1/2001 | Schutz | F16L 37/565 | 137/614.01 |
| 6,792,974 B2 * | 9/2004 | Mikiya | F16L 37/34 | 137/614.03 |
| 7,661,724 B2 * | 2/2010 | Arosio | F16L 37/34 | 285/277 |
| 8,720,487 B2 * | 5/2014 | Cooley | F16L 37/34 | 137/614.05 |
| 9,708,173 B2 * | 7/2017 | Ballard | F16L 37/30 | |
| 9,903,520 B2 * | 2/2018 | Gennasio | F16L 37/32 | |
| 10,190,713 B2 * | 1/2019 | Tiberghien | F16L 37/34 | |
| 10,767,800 B2 * | 9/2020 | Laufer | F16L 37/34 | |
| 2019/0390810 A1 * | 12/2019 | Lafond | F16L 37/23 | |

\* cited by examiner

FLUID COUPLING

CROSS-REFERENCE TO RELATED APPLICATIONS

This application claims priority to French patent application no. 1910792, filed on Sep. 30, 2019, for which a certified copy has been provided.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA EFS-WEB

Not applicable.

STATEMENT REGARDING PRIOR DISCLOSURES BY THE INVENTOR OR A JOINT INVENTOR

Not applicable.

BACKGROUND OF THE INVENTION

Field of the Invention

The present invention relates to a fluid coupling.

Description of Related Art

For the coupling, in particular for cooling circuits, it is known to use male and female coupling elements. In order to avoid any leaking during the coupling phase, it is known, in particular from CN205896502U, to use a female coupling element provided with two seals. The first seal ensures the radial tightness between a female body, in which the first seal is inserted, and a slide valve, such that no fluid can leak in the uncoupled configuration. During the coupling phase, a first step consists of inserting the male part into the inlet of the female part. This inlet is provided with a second seal, which makes it possible to establish the tightness between the male part and the female part before creating a passage for the fluid between the male part and the female part. However, when the male part is uncoupled from the female part, the second seal is exposed and can therefore be altered between two connections.

The invention aims to resolve this drawback by proposing a more durable fluid coupling.

To that end, the invention relates to a fluid coupling comprising a female element and a male element able to be inserted into the female element. The female element comprises a main body defining a main inner channel, which extends along a longitudinal central axis, and comprising a fixed central plunger. The female element also comprises a slide valve, movable longitudinally in the main inner channel around the plunger between a closed configuration and an open configuration of the main inner channel. The male element comprises a complementary body defining a complementary inner channel and a valve movable in the complementary inner channel between a closed off position of the complementary inner channel, in which a first seal ensures the tightness between the valve and the complementary body, and a separated position, in which the valve no longer closes off the complementary inner channel. In an uncoupled configuration of the fluid coupling, the slide valve is in the closed configuration and cooperates radially tightly with the main body by means of a second seal housed in an inner groove of the main body, while the valve is in the closed position. In a coupled configuration of the fluid coupling, the valve is pushed back in the separated position by the plunger while the complementary body cooperates with the slide valve, which is in the open configuration. According to the invention, the slide valve comprises an outer slide valve and an inner slide valve, which are movable relative to one another. The slide valve is such that, in the closed configuration, the second seal cooperates with the outer slide valve, which is in a forward position, and the inner slide valve is in a forward position in which the inner slide valve is in tight contact with the outer slide valve and with the plunger. In the open configuration, the outer slide valve is in a withdrawn position and the inner slide valve is in an offset position relative to the outer slide valve, such that a passage for a fluid exists between the outer slide valve and the inner slide valve. Furthermore, a first spring is inserted between the inner slide valve and the main body in order to push the inner slide valve back toward its forward position, and the female element comprises at least one gear reduction member. The or each gear reduction member is such that, during a coupling phase of the female and male elements to transition the fluid coupling from the uncoupled configuration to the coupled configuration, irrespective of the longitudinal position of the outer slide valve between the forward position and an intermediate position, in which the complementary body cooperates tightly with the second seal, the gear reduction member is disengaged from at least one among a front stop surface arranged on the main body, a rear stop surface arranged on the outer slide valve and a front stop surface arranged on the inner slide valve, the inner slide valve being kept in tight contact with the outer slide valve and with the plunger. From the intermediate position to the withdrawn position of the outer slide valve, the gear reduction member is engaged with the front stop surface of the main body, with the rear stop surface of the outer slide valve and with the front stop surface of the inner slide valve, each gear reduction member moving the inner slide valve toward its offset position relative to the outer slide valve.

Owing to the invention, the contact between the inner slide valve, the outer slide valve and the plunger is kept tight during the passage from the forward position to the intermediate position of the outer slide valve. Additionally, during this phase, the placement of the complementary body in contact with the second seal makes it possible to ensure the tightness between the male element and the female element. Thus, the tightness between the male element and the female element is ensured before the slide valve enters the open configuration and a passage is created for the fluid. Furthermore, the second seal is never exposed or left in contact with air. Indeed, in the closed configuration, the second seal is radially covered by the slide valve. In the coupling phase and in the coupled configuration, the second seal is protected by the complementary body. Thus, the second seal is always protected and does not risk being altered between two connections.

SUMMARY OF THE INVENTION

According to advantageous, but optional aspects of the invention, such a fluid coupling may incorporate one or more of the following features, considered in any technically allowable combination:

From the intermediate position to the withdrawn position of the outer slide valve, which the outer slide valve adopts in the coupled configuration of the fluid coupling:
  the inner slide valve is moved toward the rear relative to the outer slide valve,
  a longitudinal travel of the inner slide valve relative to the main body is at least 1.5 times greater than a longitudinal travel of the outer slide valve relative to the main body.

From the forward position to the intermediate position of the outer slide valve, each gear reduction member is disengaged from the front stop surface arranged on the main body and is translatable longitudinally in the main body.

A second spring is inserted between the outer slide valve and the main body, pushing the outer slide valve back toward its forward position.

The resilient force of the second spring is greater than the resilient force of the first spring.

Each gear reduction member is a lever that, from the intermediate position to the withdrawn position of the outer slide valve, pivots in the main body about an axis located in a plane orthogonal to the longitudinal central axis.

Along a direction radial to the longitudinal central axis, the rear stop surface of the outer slide valve is arranged on the same side, relative to the front stop surface of the main body, as the front stop surface of the inner slide valve.

The lever comprises an outer head and an inner head, which are preferably spherical, arranged radially on either side of an intermediate connecting body, the outer head being engaged in an inner housing of the main body delimited longitudinally by the front stop surface of the main body and the inner head being engaged in a housing of the inner slide valve delimited longitudinally by the front stop surface of the inner slide valve, the intermediate body being able to come into contact against the rear stop surface of the outer slide valve.

In the uncoupled configuration of the fluid coupling, the lever is inclined relative to the orthogonal plane and the outer head is behind the inner head, and in the coupled configuration of the fluid coupling, the lever is inclined relative to the orthogonal plane and the outer head is in front of the inner head.

The gear reduction member is able to abut, in a direction radial to the longitudinal central axis, against a connecting surface arranged on the outer slide valve and, in an opposite radial direction, against the main body.

The gear reduction member is mounted, without possibility of relative longitudinal movement, in a housing of the inner slide valve delimited longitudinally by the front stop surface.

In the uncoupled configuration of the fluid coupling, a front face of the plunger, able to come into contact with the valve of the male element in order to push it back into the separated position, is offset toward the rear relative to a front face of the outer slide valve by a distance equal to a longitudinal distance traveled by the outer slide valve relative to the main body from its forward position to its intermediate position.

A third lip seal provides the tightness between the inner slide valve and the outer slide valve in the closed configuration of the slide valve.

The first seal and the third seal have an identical geometry.

The complementary body is mounted on a complementary support with the possibility of relative clearance perpendicular to a longitudinal axis defined by the complementary body.

BRIEF DESCRIPTION OF THE SEVERAL VIEWS OF THE DRAWINGS

The invention will be better understood and other advantages thereof will appear more clearly in light of the following description of two embodiments of a fluid coupling according to the invention, provided solely as an example and done in reference to the drawings, in which.

DETAILED DESCRIPTION OF THE INVENTION

Figure 1:
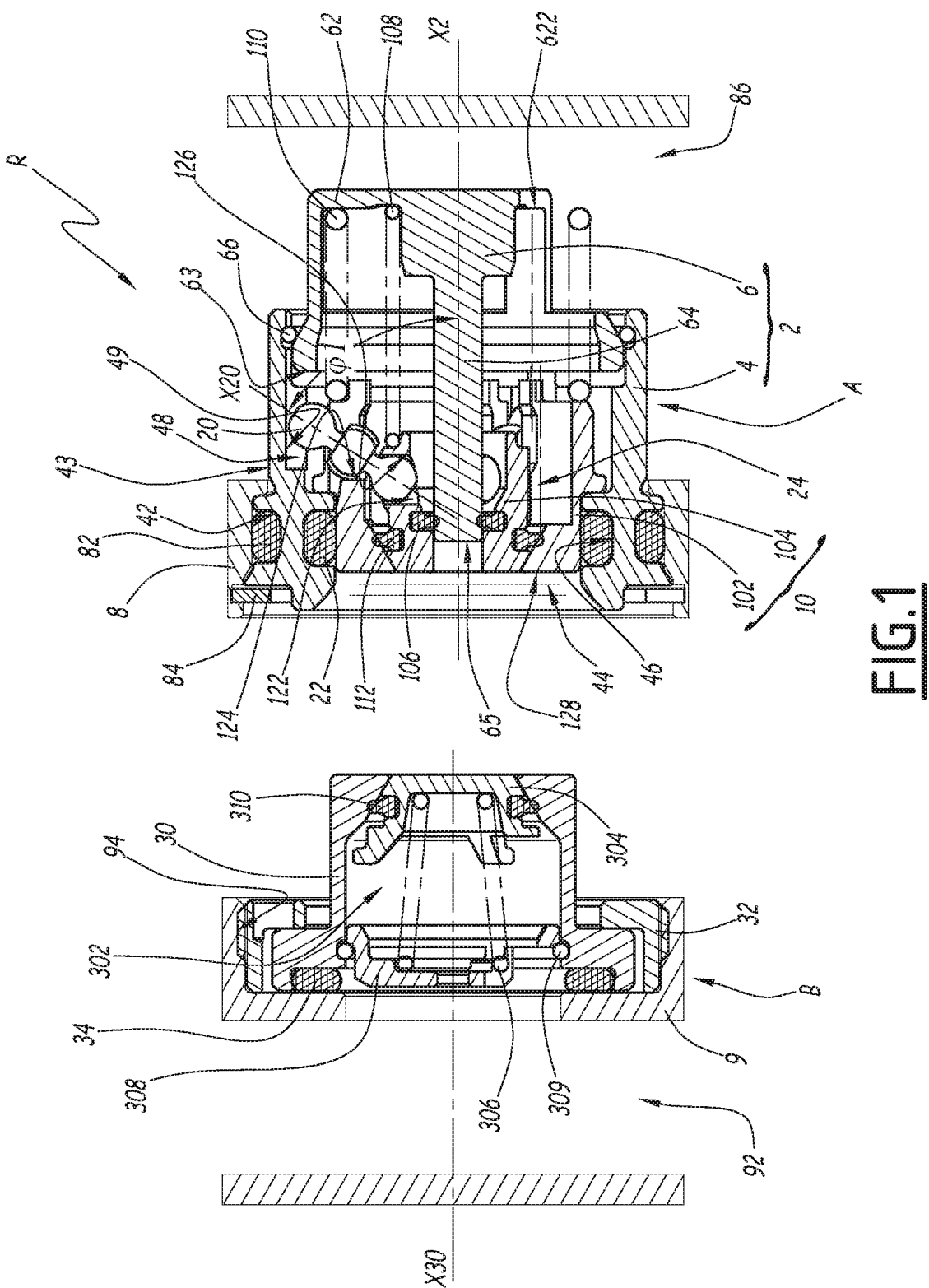
FIG. 1 is a longitudinal sectional view of a coupling according to a first embodiment of the invention, in an uncoupled configuration.

FIG. 1 shows a fluid coupling R comprising a female coupling element A and a male coupling element B. In this figure, the fluid coupling R is in an uncoupled configuration, the female element A therefore being separated from the male element B. The coupling elements A and B are configured such that the male element B can be inserted into the female element A.

The insertion of the male element B into the female element A is done during a coupling phase. At the end of this coupling phase, the fluid coupling R is in a coupled configuration, shown in FIG. 6.

The female element A comprises a main body 2, which comprises an outer body 4 and a plunger body 6. The main body 2 is of revolution and defines a longitudinal central axis X2.

Hereinafter, when the female element A is in question, the term "front" refers to a longitudinal direction oriented on the side of the male element B at the beginning of the coupling, or toward the left in FIG. 1, and the term "rear" refers to an opposite longitudinal direction. When the male element B is in question, the term "front" refers to a longitudinal direction oriented on the side of the female element A at the beginning of the coupling, or toward the right in FIG. 1, and the term "rear" refers to an opposite longitudinal direction.

The terms "longitudinal", "radial", "transverse" and "axial", "outer" and "inner" are used in reference to the longitudinal central axis of the coupling element in question.

Hereinafter, the term "seal" is used to define sealing barriers.

The female element A is mounted tightly on a support 8. The tightness between the female element A and the support 8 is for example provided by an O-ring 82, inserted in an outer peripheral groove 42, arranged to that end on an outer face 43 of the outer body 4.

The female element A is stopped longitudinally to the rear relative to the support 8 by a stop arranged in the outer body 4 and to the front by a stop segment 84. The stop segment 84 is placed in front of the support 8 such that the front of the female element A does not protrude from the support 8.

The support 8 comprises a port 86, which extends transversely.

The outer body 4 delimits a mouth 44 with a flared surface, as well as an inner peripheral groove 46 accommodating a seal 22.

The outer body 4 also delimits three longitudinal inner housings 48, the section of which, considered perpendicular to the axis X2, has an arc of circle profile.

Each inner housing 48 is radially delimited by a stop surface 49 arranged on the main body 2, in particular on the outer body 4.

The mouth 44 is placed in front of the outer body 4, the inner peripheral groove 46 is placed behind the mouth 44, along the axis X2, and the inner housings 48 are placed behind the inner peripheral groove 46 of the mouth 44.

The plunger body 6 comprises a skirt 62 that secures the plunger body 6 to the outer body 4 and that delimits the rear of the female body A. The plunger body comprises a plunger 64, extending longitudinally inside the outer body 4 toward the front of the female element A. A front face 63 of the skirt 62 forms a front stop surface of the main body 2 and delimits the rear of the inner housings 48. The front stop surface 63 extends perpendicular to the axis X2 and is oriented toward the front of the female element A. The plunger 64 forms a stationary central cylindrical rod of the female element A, of circular section and centered on the axis X2.

Together, the outer body 4 and the plunger body 6 form a main inner channel 24, in which the plunger 64 is inserted, while extending along the axis X2.

The main inner channel 24 communicates with the port 86 owing to recesses 622 of the skirt 62.

The inner housings 48 are open on the main inner channel 24.

Figure 2:
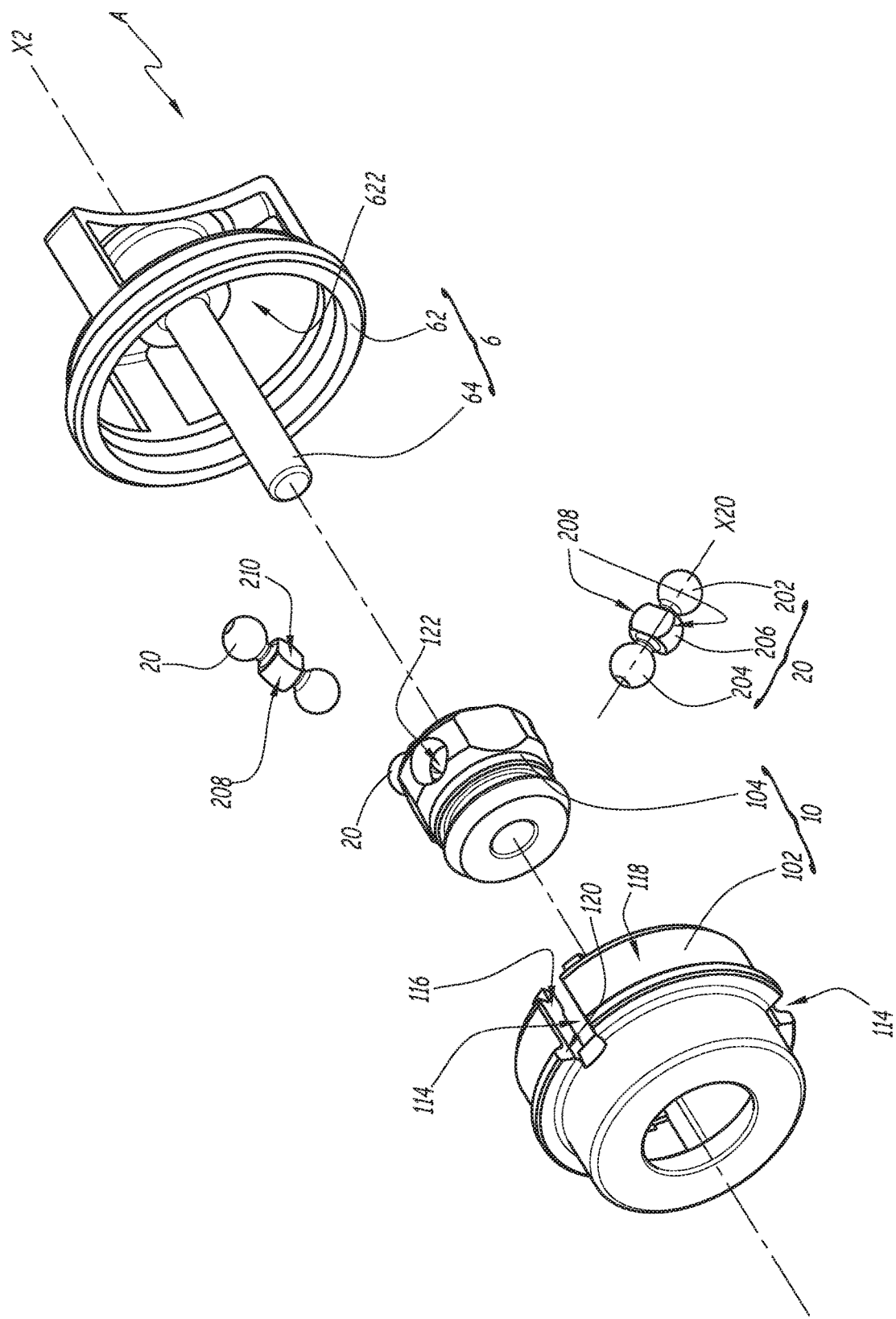
FIG. 2 is an exploded perspective view of a portion of a female element of the coupling of FIG. 1.

The female element A also comprises a slide valve 10 comprising an outer slide valve 102 and an inner slide valve 104, also visible in FIG. 2 in exploded view, which are movable relative to one another.

Figure 6:
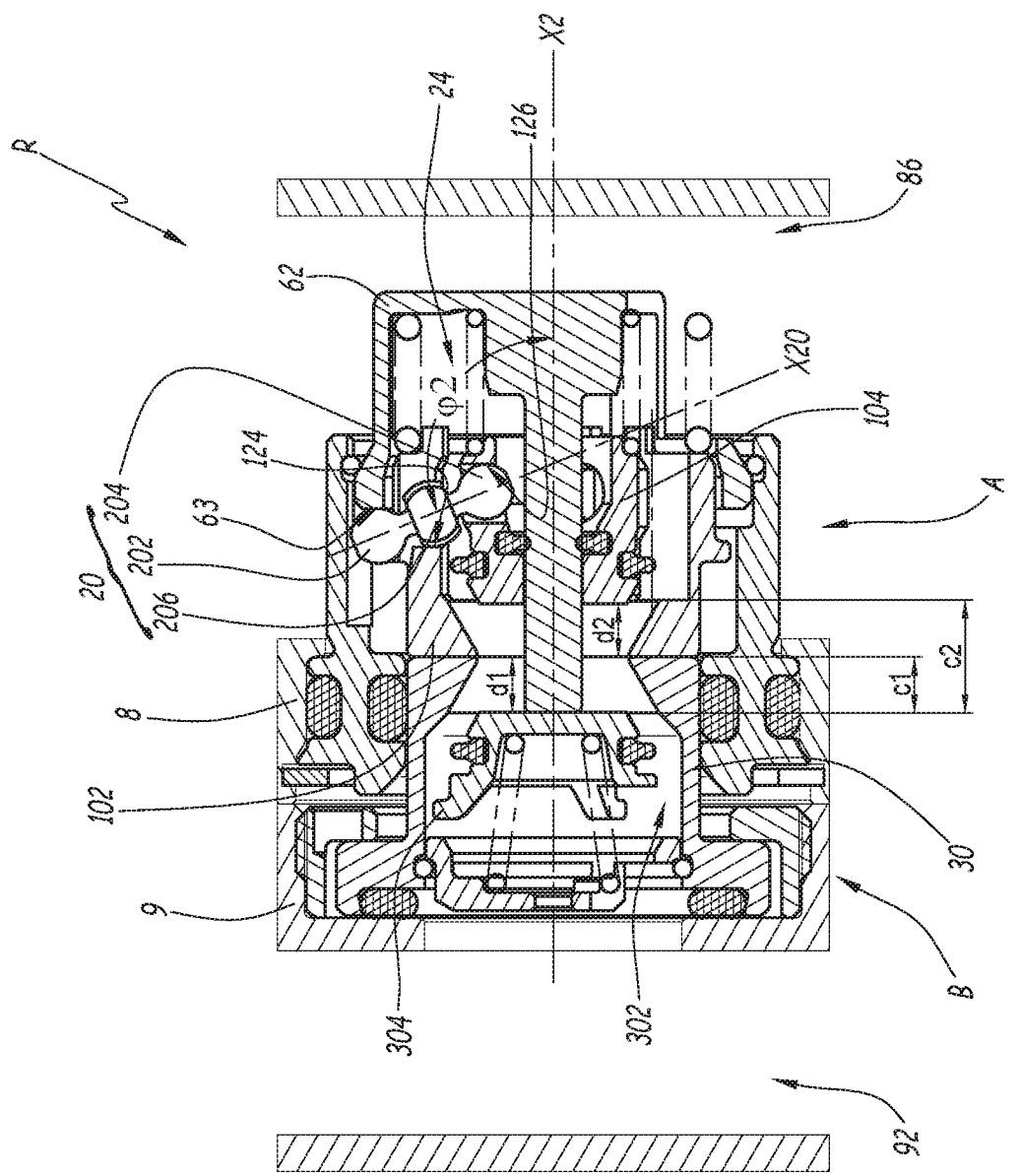
FIG. 6 is a view similar to FIG. 1, illustrating a coupled configuration.

The slide valve 10 is longitudinally movable in the main inner channel 24 about the plunger 64, between a closed configuration, shown in FIG. 1, when the fluid coupling R is in the uncoupled configuration, and an open configuration, shown in FIG. 6, when the fluid coupling R is in the coupled configuration.

The inner slide valve 104 is arranged sliding about the plunger 64. A lip seal 106 provides the tightness of the connection between the plunger 64 and the inner slide valve 104 irrespective of the position of the inner slide valve 104 along the plunger 64. The inner slide valve 104 is returned toward the outer slide valve 102 by a spring 108 inserted between the plunger body 6 and the inner slide valve 104.

The outer slide valve 102 is arranged radially between the inner slide valve 104 and the outer body 4. In the uncoupled configuration, like in FIG. 1, the inner slide valve 104 is in a forward position and the outer slide valve 102 is pushed back toward the front of the main body 2 in a forward position by a spring 110 inserted between the plunger body 6 and the outer slide valve 102. The spring 110 pushes the outer slide valve 102 back toward its forward position and the plunger body 6 against a retaining ring 66 housed in an inner groove of the outer body 4. Thus, the plunger body 6 is fixed in the longitudinal direction relative to the outer body 4.

Along the axis X2, the resilient force of the spring 110 is greater than the resilient force of the spring 108.

Thus, in the closed configuration, the inner slide valve 104 and the outer slide valve 102 cooperate in order to close the main inner channel 24 in front of the female element A. The tightness between the inner slide valve 104 and the outer slide valve 102 is achieved by a lip seal 112 that bears, along the longitudinal axis X2, on a seat formed on the outer slide valve 102. This seal easily accommodates variations in relative position between the outer slide valve 102 and the inner slide valve 104, unlike an O-ring, which must be crushed in order to ensure reliable tightness between the two slide valves 102 and 104.

In this configuration, the seal 22 provides the radial tightness between the main body 2 and the slide valve 10.

The outer slide valve 102 comprises three longitudinal slots 114, blind toward the front, emerging toward the rear and through in the radial direction. Each slot 114 comprises two lateral surfaces 116 that are planar and parallel to a radial plane forming a median plane of the slot. Each lateral surface 116 is connected to an outer radial surface 118 of the outer slide valve by a planar connecting surface 120 that is inclined relative to the lateral surface 116 by an angle of 30°. The bottom of each slot 114 extends perpendicular to the axis X2 and forms a rear stop surface 124 of the outer slide valve 102 that is oriented toward the rear of the female element A.

In a variant, each connecting surface 120 is inclined relative to the corresponding lateral surface 116 by an angle different from 30°, for example an angle between 20° and 45°.

The inner slide valve 104 comprises three radial housings 122, of circular section, which are through housings and the inner surfaces of which form front stop surfaces 126 of the inner slide valve 104 that are oriented toward the front of the female element A.

The female element A also comprises three gear reduction members 20 of the opening of the main inner channel 24 that convert the longitudinal movement of the outer slide valve 102 in the main body 2 into a longitudinal movement of the inner slide valve 104 relative to the outer slide valve 102.

Each gear reduction member 20 is an elongate lever, which extends lengthwise along an axis X20. Each gear reduction member 20 comprises an outer spherical head 202, an inner spherical head 204 and an intermediate body 206, connecting the outer spherical head 202 and the inner spherical head 204. The respective diameters of the outer spherical head 202 and the inner spherical head 204 of each gear reduction member 20 are identical and respectively correspond, to within any functional play, to the diameters of the inner housings 48 and the radial housings 122.

Figure 5:
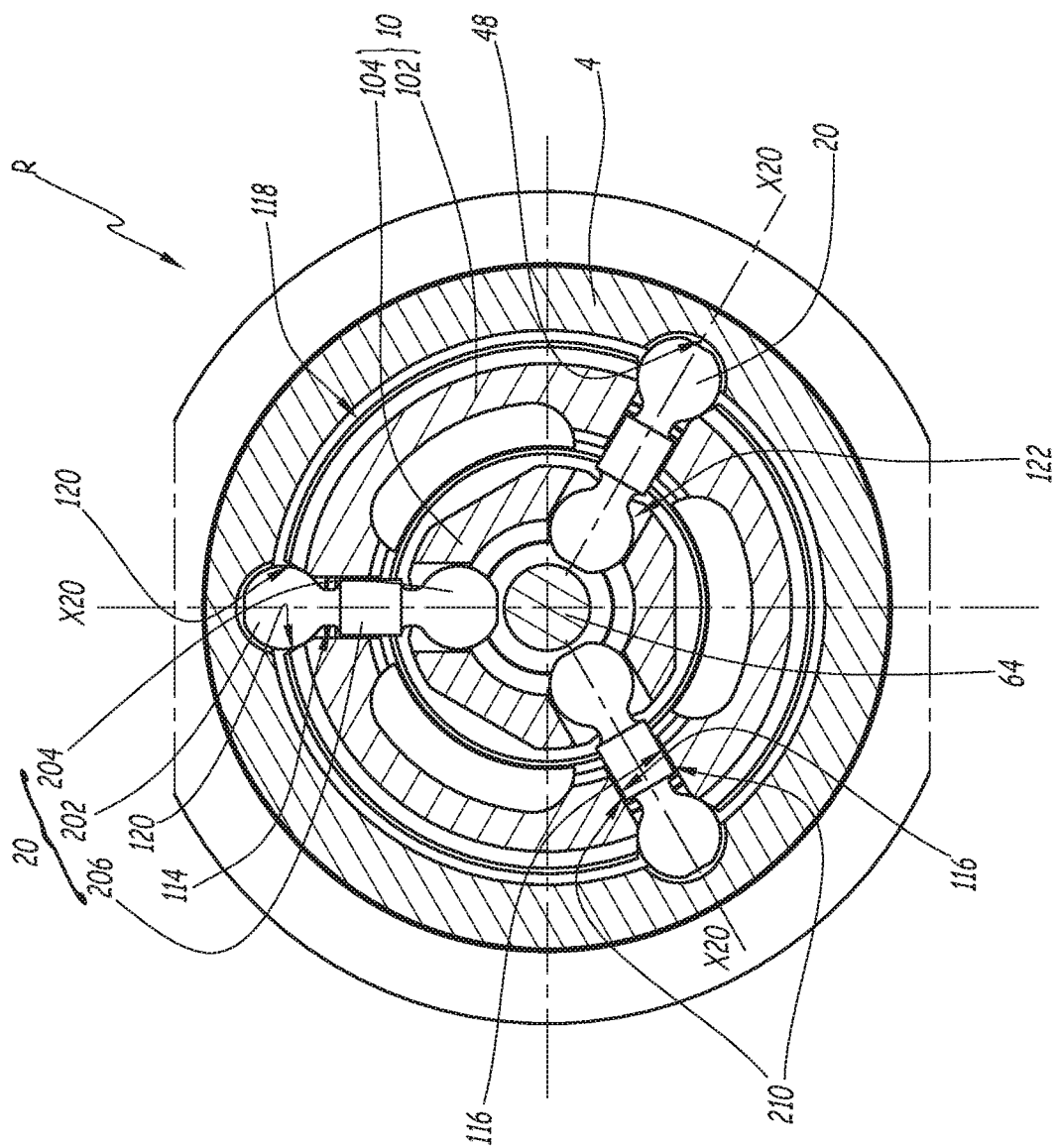
FIG. 5 a cross-section of the coupling of FIG. 1, along plane V of FIG. 4.

As shown in FIG. 5, in the assembled state of the female element A, each outer spherical head 202 is radially maintained between the outer body 4 and the outer slide valve 102 while being able to cooperate with the corresponding connecting surface 120 in a direction radial to the axis X2, facing toward the axis X2, and to cooperate with the stop surface 49 of the corresponding inner housing 48 in an opposite radial direction. Thus, the movement of each gear reduction member 20 is limited by the outer slide valve 102 in a radial direction toward the axis X2 and by the outer body 4 in an opposite radial direction.

The intermediate bodies 206 of the gear reduction members 20 are in turn housed in the longitudinal slots 114 of the outer slide valve 102.

Each inner spherical head 204 is kept in the inner slide valve 104 while being housed in the corresponding radial housing 122 by shape cooperation between the inner spherical head 204 and the radial housing 122. In particular, the gear reduction member 20 is mounted in the housing 122 of the inner slide valve 104 with no possibility of longitudinal movement relative to the inner slide valve 104, to within any functional play. Longitudinally toward the rear, the inner spherical head 204 is stopped by the front stop surface 126 of the inner slide valve 104.

Each intermediate body 206 comprises two spherical surface portions 208. These two spherical portions 206 are connected by two lateral surfaces 210 that are planar and parallel to one another.

As better shown in FIG. 5, the axes X20 of the gear reduction members 20 are secant with the axis X2 and extend in three longitudinal planes, not shown in the figures, distributed evenly about the axis X2. In the uncoupled configuration, the axis X20 of each gear reduction member 20 is inclined relative to the axis X2 by an angle φ1 of less than 90°, the angle φ1 being considered on the rear side of the gear reduction member 20. Thus, the inner spherical head 204 of each gear reduction member 20 is further forward than the outer spherical head 202.

In this configuration, each gear reduction member 20 bears against the rear stop surface 124 of the outer slide valve, by means of the intermediate body 206, and against the front stop surface 126 of the corresponding radial housing 122, by means of the inner spherical head 204. The outer spherical head 202 is opposite, but not in contact with, the front stop surface 63 of the main body 2.

In the uncoupled configuration, a front face 65 of the plunger 64 is located behind a front face 128 of the outer slide valve 102. Longitudinally, the front face 65 of the plunger 64 is located at the inner groove 46 of the outer body 4. In particular, the front face 65 extends in a plane, not shown in the figures, that is secant to the inner groove 46. The front faces of the outer and inner slide valves are flush.

The male element B comprises a complementary tubular body 30 defining a longitudinal central axis X30, as well as a cover 32.

The male element B is intended to be mounted on a complementary support 9 that forms a coupling assembly with the support 8. The complementary support 9 comprises a complementary port 92 that is transverse relative to the axis X30. To that end, the complementary support 9 is provided with a housing 94 emerging in front of the complementary support 9, in which the cover 32 is screwed. The tightness between the male element B and the complementary support 9 is provided by a seal 34.

Owing to the cover 32, the male element B is mounted on the complementary support 9 with a possibility of relative clearance. More specifically, the cover 32 allows a movement of the complementary body 30 relative to the complementary support 9 in all directions perpendicular to the axis X30, while preserving the tightness between the complementary body 30 and the complementary support 9.

The complementary body 30 delimits a complementary inner channel 302 that houses a valve 304, pushed back into a front position for closing off the complementary inner channel 302 by a spring 306.

In the mounted position of the complementary body 30 in the complementary support 9, the complementary inner channel 302 communicates with the complementary port 92.

The valve 304 is movable between the closed off position, shown in FIG. 1, and a separated rear position, illustrated in FIG. 6.

The spring 306 bears against a hollowed out stop part 308, which in turn abuts rearwardly against a retaining ring 309 contained in the complementary body 30.

In the uncoupled configuration, the valve 304 is in a closed off position and abuts forwardly against the complementary body 30. The front surfaces of the complementary body 30 and the valve 304 are flush. The tightness between the complementary body 30 and the valve 304 in this configuration is provided by a lip seal 310.

The seal 112 and the seal 310 have an identical geometry, that is to say they have the same diameter, the same shape in the free configuration. The grooves housing these seals 112 and 310 also have an identical geometry.

In a variant, the seal 112 has a different geometry from the seal 310. The grooves housing these seals therefore also have different geometries.

In a variant, the seals 112 and 310 are adhered seals.

Hereinafter, the movement of a single gear reduction member 20 will be described, the movement of the other gear reduction members 20 being the same.

In a first step of a coupling phase not shown in the figures, the axes X2 and X30 are parallel and the supports 8 and 9 are brought closer together parallel to the axis X2. The male element B is guided in the female element A via the mouth 44. Thus, the axis X30 is aligned with the axis X2 by movement of the complementary body 30 relative to the complementary support 9, owing to the possibility of clearance of the complementary body 30 relative to the complementary support 9, perpendicular to the axes X30 and X2. Thus, it is not necessary to have a perfect alignment between the axes X30 and X2 prior to the first coupling step, to be able to perform the coupling. An alignment defect between the axes X2 and X30, compatible with the clearance of the male element B relative to the complementary support 9, for example of the order of 0.25 mm, is allowed.

In this first step, the front face of the complementary body 30 comes into contact with the front face 128 of the outer slide valve 102 and the front face 65 of the plunger 64 is at a distance from the front face of the valve 304.

Figure 3:
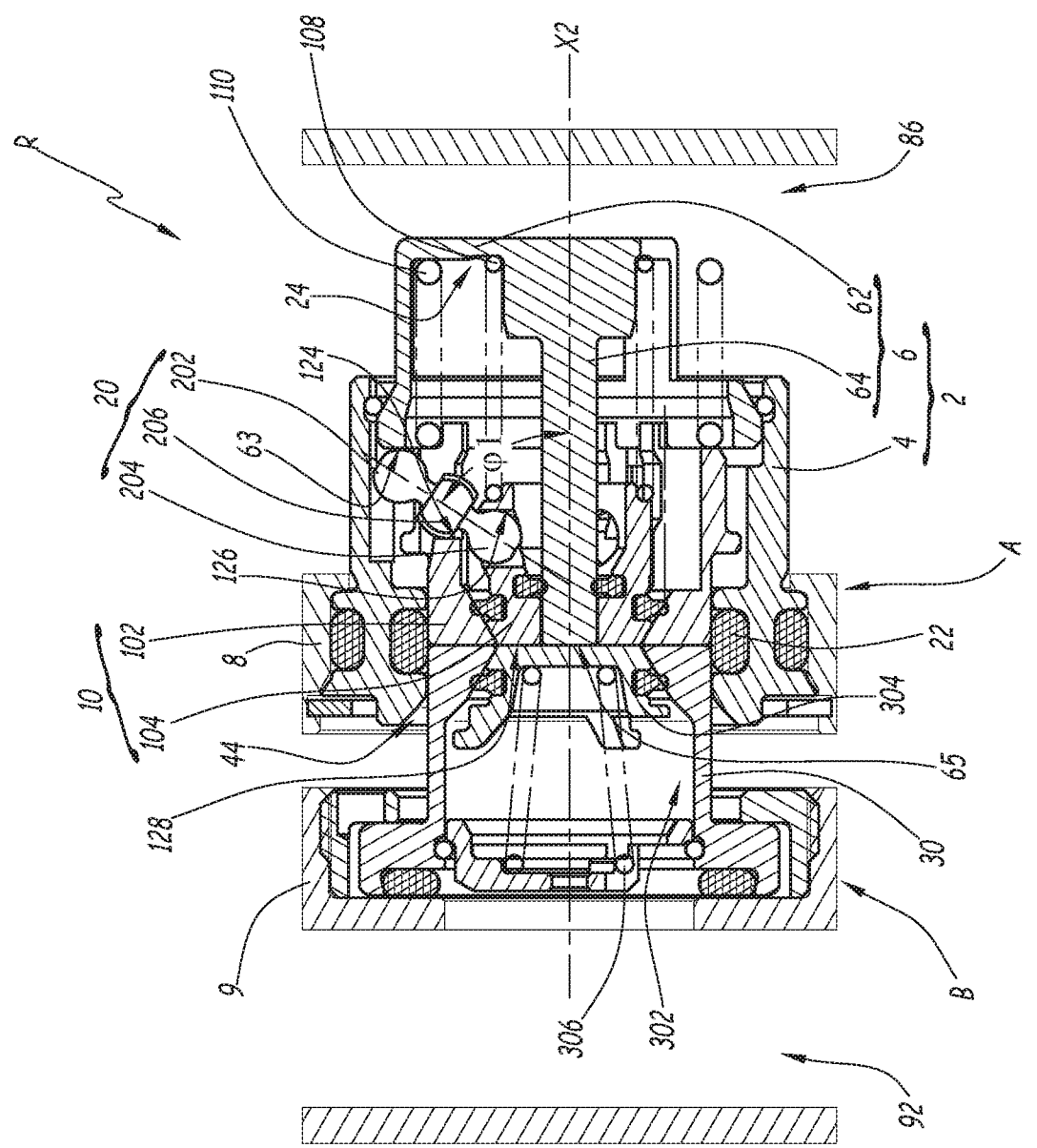
FIG. 3 is a view similar to FIG. 1, illustrating a coupling step.

In a second step, which leads to the configuration of FIG. 3, the approach of the supports 8 and 9 continues. The complementary body 30 pushes back the entire slide valve 10. In this step, the inner slide valve 104 is still in tight contact with the outer slide valve 102.

In the configuration of FIG. 3, the outer slide valve 102 is in an intermediate position, in which the outer slide valve 102 and the complementary body 30 cooperate tightly with the seal 22, and the inner slide valve 104 is in a limit contact position with the outer slide valve 102. When the outer slide valve 102 is withdrawn past its intermediate position, the inner slide valve 104 loses contact with the outer slide valve 102, that is to say the tight contact is not maintained when the outer slide valve 102 is pushed toward the rear past its intermediate position.

The main inner channel 24 is therefore still closed off by the slide valve 10. The withdrawal movement of the slide valve 10 pushes back the gear reduction member 20, which nevertheless stays engaged with the corresponding rear stop surface 124 of the outer slide valve and with the corresponding front stop surface 126 of the radial housing 122. During this step, the gear reduction member 20 moves in longitudinal translation in the main body 2 and the outer spherical head 202 of the gear reduction member 20 moves in its corresponding inner housing 48, until it abuts against the front stop surface 63 of the main body 2. During this movement, the outer spherical head 202 of each gear reduction member 20 being disengaged from the front stop surface 63 of the main body 2, the incline φ1 of the axis X20 of the gear reduction member 20 relative to the axis X2 is unchanged. In this step, the gear reduction member 20 does not act on the relative longitudinal position of the inner slide valve 104 and the outer slide valve 102.

In a variant, in this step, each gear reduction member 20 is disengaged from the front stop surface 126 of the inner slide valve 104.

Thus, irrespective of the longitudinal position of the outer slide valve 102 between the forward position and the intermediate position, the gear reduction member 20 is disengaged from at least one among a front stop surface 63 arranged on the main body 2, a rear stop surface 124 arranged on the outer slide valve 102 and a front stop surface 126 arranged on the inner slide valve 104 and the inner slide valve 104 is kept in tight contact with the outer slide valve 102.

"Disengaged from a stop surface" means that the gear reduction member 20, by moving, does not exert a force against this stop surface. On the contrary, "engaged with a stop surface" means that the gear reduction member 20 is engaged with this stop surface and that by moving, the gear reduction member 20 exerts a longitudinal force against this stop surface. In particular, when the gear reduction member 20 is engaged with a stop surface, it is in longitudinal contact with this stop surface.

The slide valve 10 withdrawing in the main body 2 toward an intermediate position, offset from a forward position that corresponds to the forward position of the outer 102 and inner 104 slide valves, it partially frees the seal 22, with which the complementary body 30 can then cooperate. Thus, the female element A is tightly engaged with the male element B before the main inner channel 24 is connected to the complementary inner channel 302.

The longitudinal distance between the front face 65 of the plunger 64 and the front face 128 of the outer slide valve 102 in the uncoupled configuration is equal to the longitudinal distance traveled by the outer slide valve 102 relative to the main body 2 from its forward position to its intermediate position. At the end of this step, the front face of the valve 304 is therefore in contact with the front face 65 of the plunger.

This distance, also called "free travel" of the gear reduction member 20, without relative longitudinal movement between the outer slide valve 102 and the inner slide valve 104, makes it possible to ensure the radial sealing engagement between the complementary body 30 and the main body 2 before the opening of the female A and male B elements.

Figure 4:
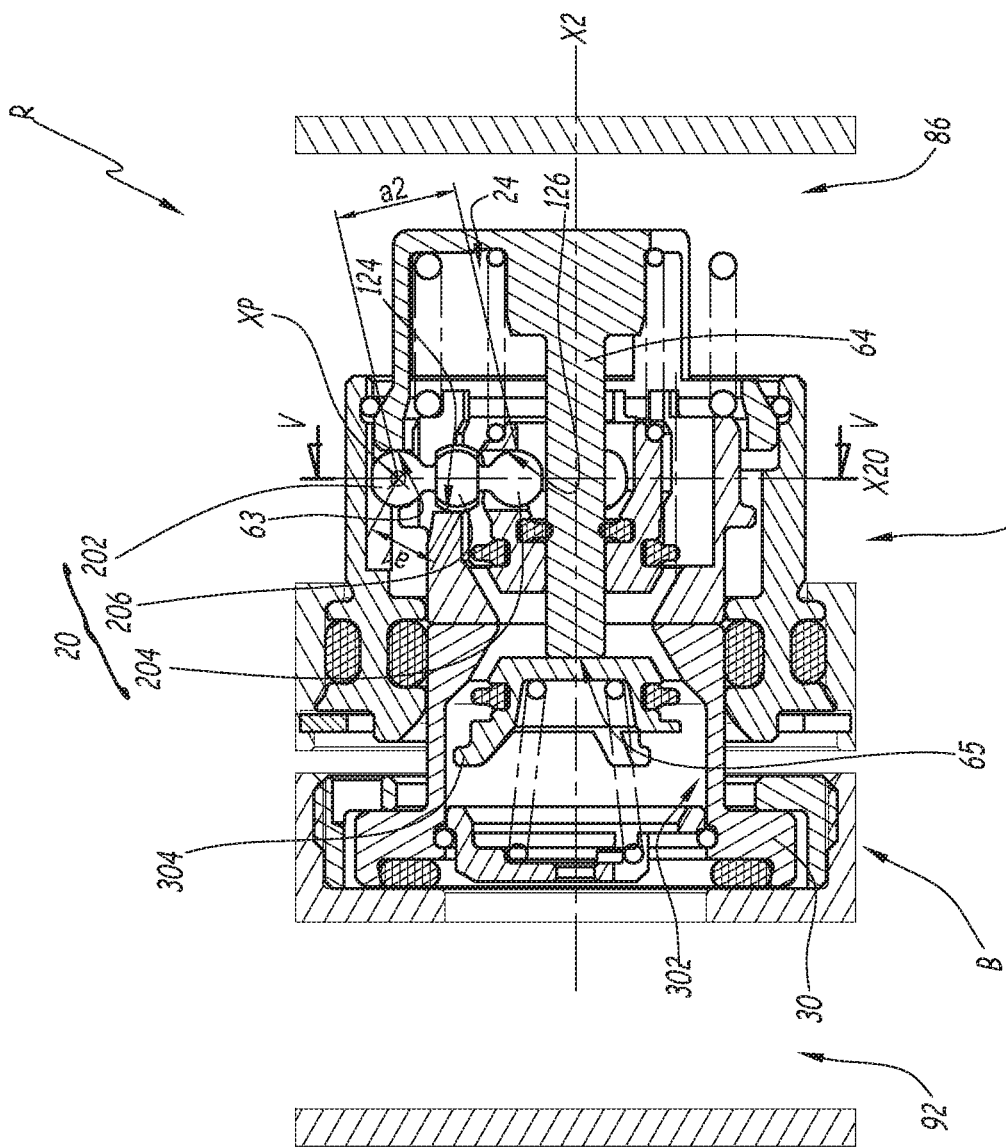
FIG. 4 is a view similar to FIG. 1, illustrating a coupling step subsequent to that of FIG. 3.

In a third step, illustrated in FIG. 4, the coupling continues. The outer slide valve 102 is pushed back toward the rear by the complementary body 30 from the intermediate position to the withdrawn position in order to reach the open configuration of the slide valve 10. By withdrawing, the outer slide valve 102 pushes, by means of the rear stop surface 124 of the outer slide valve 102, the intermediate body 206 of the gear reduction member 20, which is engaged with the rear stop surface 124. The outer spherical head 202 staying in contact and engaged with the front stop surface 63 of the main body 2, the gear reduction member 20 performs a rotation in the main body 2 about a pivot axis XP passing through the center of the outer spherical head 202 and orthoradial to the axis X2. The pivot axis XP is located in a plane orthogonal to the axis X2. The pivot axis XP is arranged past the slide valve 10 in a radial direction external to the axis X2. The inner spherical head 204 being in contact and engaged with the front stop surface 126 of the inner slide valve 104, the inner slide valve 104 is driven by the gear reduction member 20 toward the rear of the main body 2.

A distance a1 is defined as the distance between the pivot axis XP of the gear reduction member 20, that is to say the center of the outer spherical head 202, and the point of contact between the intermediate body 206 and the rear stop surface 124 of the outer slide valve 102. A distance a2 is defined as the distance between the pivot axis XP of the gear reduction member 20 and the point of contact between the inner spherical head 204 and the front stop surface 126 of the inner slide valve 104. The distances a1 and a2 are considered projected in a plane perpendicular to the plane of FIG. 5 and parallel to the axis X20 of the gear reduction member 20 in question. The distance a2 being greater than the distance a1, there is a gear reduction between the movement of the outer slide valve 102 and the movement of the inner slide valve 104. In the example of the figures, a longitudinal travel c2, relative to the main body 2, of the inner slide valve 104 between its contact limit position with the outer slide valve 102 and an offset position of the outer slide valve 102, which the outer slide valve adopts when the female element A is in the coupled configuration with the male element B, is at least 1.5 times, preferably at least 2 times, greater than a longitudinal travel c1, relative to the main body 2, of the outer slide valve 102 between its intermediate position and its withdrawn position in the coupled configuration.

The slide valve 10 is pushed back in the open configuration by the complementary body 30, which cooperates with the outer slide valve 102 of the slide valve 10. The front face of the inner slide valve 104 is therefore offset from the front face of the outer slide valve 102 and the inner slide valve 102 is in its offset position relative to the outer slide valve 104, which creates a passage for a fluid from or to the main inner channel 24 between the inner slide valve 104 and the outer slide valve 102. The gear reduction member 20 reduces the movement of the outer slide valve 102 into movement of the inner slide valve 104, which makes it possible to clear a maximum passage between the inner slide valve 104 and the outer slide valve 102 with a minimum travel of the outer slide valve 102. This makes it possible to minimize the space requirement of the fluid coupling R.

In parallel with the movement of the slide valve 10, the plunger 64 pushes back the valve 304 behind the complementary inner channel 302, which breaks the tightness between the valve 304 and the complementary body 30. The fluid can therefore go from one to the other of the coupling elements A and B, while guaranteeing the tightness between the female element A and the male element B, as well as between the inner slide valve 104 and the plunger 64.

The pivoting of the gear reduction member 20 takes place until the supports 8 and 9 reach a given relative position along the axis X2. For example, like in FIG. 6, the pivoting takes place until the supports 8 and 9 come into contact.

In this configuration, which is the coupled configuration of the fluid coupling R, the outer spherical head 202 is in contact with the front stop surface 63 of the main body 2, the intermediate body 206 is in contact with the rear stop surface 124 of the outer slide valve 102 and the inner spherical head 204 is in contact with the front stop surface 126 of the inner slide valve 104.

The valve 304 is in a separated position, in which the seal 310 no longer provides the tightness between the valve 304 and the complementary body 30 and the valve 304 no longer closes off the complementary inner channel 302. The inner slide valve 104 is in its offset position. The axis X20 of the gear reduction member 20 is inclined relative to the axis X20 by an angle φ2 greater than 90°, the angle φ2 being considered on the rear side of the gear reduction member 20. Thus, the outer spherical head 202 is further forward than the inner spherical head 204. In particular, the additional angle of the angle φ2 and the angle φ1 have the same value.

Thus, the fluid can circulate freely between the ports 86 and 92 by passing through the main inner channel 24, between the inner slide valve 104 and the outer slide valve 102, at the seat formed on the outer slide valve 102 for the seal 112, and in the complementary inner channel 302 by passing through the space between the valve 304 and the complementary body 30.

In this embodiment, a longitudinal distance d1, traveled by the valve 304 relative to the complementary body 30 between the closed position and the separated position of the valve 304, is equal to a longitudinal offset distance d2 of the inner slide valve 104 relative to the outer slide valve 102.

Along the radial direction, the rear stop surface 124 of the outer slide valve 102 is arranged on the same side as the front stop surface 126 of the inner slide valve 104 relative to the front stop surface 63 of the main body 2. The movement of the inner side valve 104 and the movement of the outer slide valve 102, during the passage from the intermediate position to the withdrawn position of the outer side valve 102, therefore occurs in the same longitudinal direction, toward the rear. Since the front stop surface 126 of the inner side valve 104 and the front stop surface 63 of the main body 2 are arranged on either side of the rear stop surface 124 of the outer slide valve 102 in the radial direction, the offset position of the inner slide valve 104 is a position offset toward the rear relative to the outer slide valve 102. In order for the inner slide valve 104 to adopt an offset position relative to the outer slide valve 102, the gear reduction mechanism 20 is configured to move the inner slide valve 104 from its intermediate position to its offset position over the longitudinal travel c1, which is different from the longitudinal travel c2 of the outer slide valve 102 between its intermediate position and its withdrawn position. In particular, the travel c2 is greater than the travel c1 of the outer slide valve 102 between its intermediate position and its withdrawn position. The configuration of the gear reduction member 20 in the inner 102 and outer 104 slide valves allows a movement of the inner slide valve 104 that is reduced relative to the movement of the outer slide valve 102 between its intermediate position and its withdrawn position.

For the uncoupling, the reverse sequence with respect to that described above occurs. The female element A is longitudinally separated from the male element B. Thus, the valve 304 is pushed back in the closed position by the spring 306, the outer slide valve 102 follows the withdrawal movement of the complementary body 30 and is pushed back in the forward position by the spring 110 and the inner slide valve 104 is pushed back in the forward position, against the outer slide valve 102, by the spring 108. The gear reduction members 20 pivot in the main body 2 until the inner slide valve 104 comes into tight contact with the outer slide valve 102. The outer slide valve 102 then cooperates tightly with the seal 22.

The geometry of the gear reduction members 20 and their arrangement in the female element A allows a compact construction of the fluid coupling R. The kinematic of the construction with the longitudinally movable gear reduction members 20 is simple, and the free travel of the gear reduction members 20 depends little on the allowances and relative positioning of the different parts of the fluid coupling R.

A second embodiment of the fluid coupling, referenced R', is illustrated in FIGS. 7 to 10.

Hereinafter, the differences between the first embodiment and the second embodiment will mainly be described. The components that structurally remain identical to the first embodiment will be designated using the same references as above and will not be described in detail. The components that are structurally different will have the same reference followed by an apostrophe.

In this embodiment of the fluid coupling R', the male element B is identical to that of the first embodiment; its components will therefore be designated hereinafter by the same references as in the first embodiment.

Figure 7:
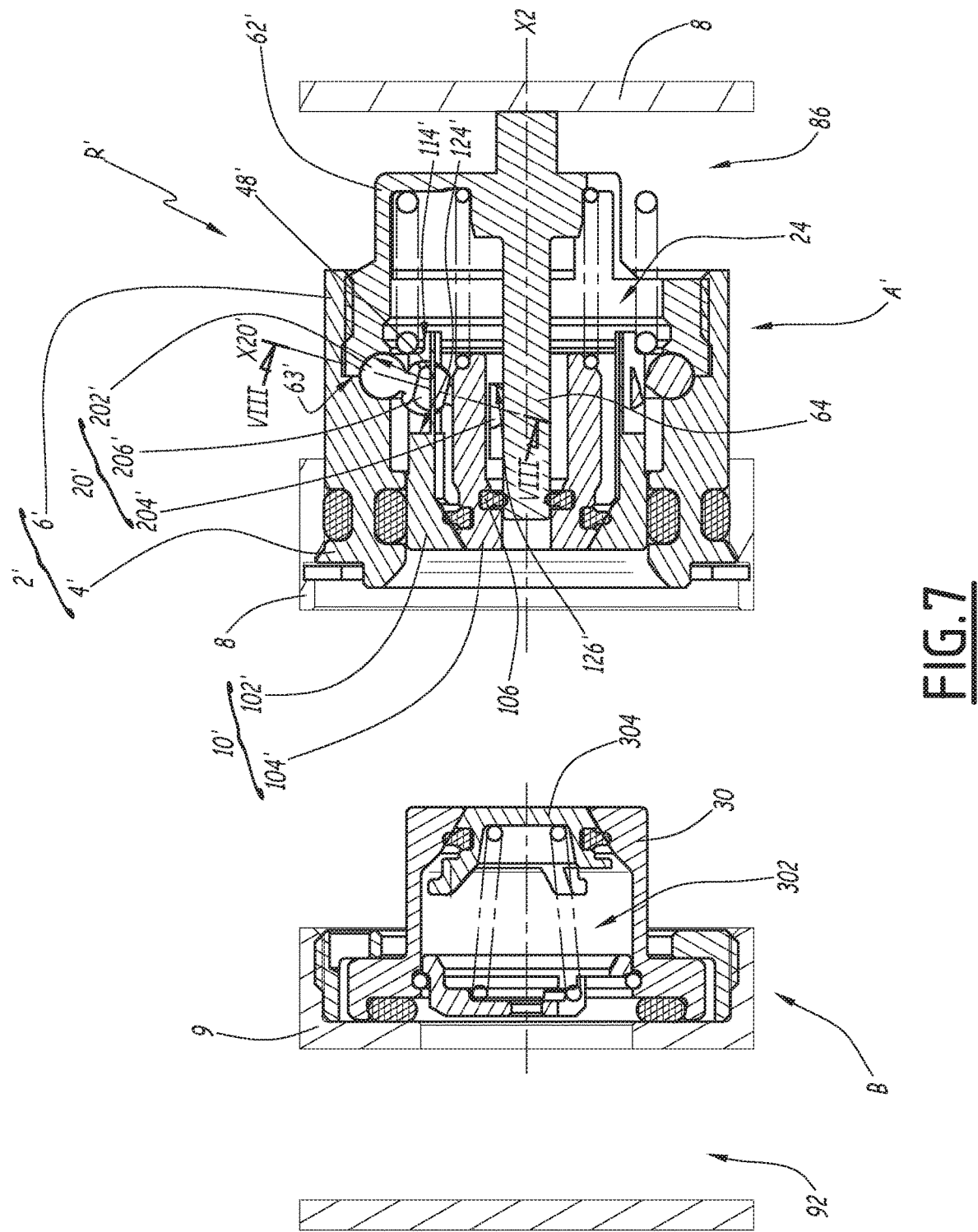
FIG. 7 is a longitudinal sectional view of a coupling according to a second embodiment of the invention, in an uncoupled configuration.

FIG. 7 shows the fluid coupling R' in the uncoupled configuration.

The female element A' comprises a main body 2', comprising an outer body 4' and a plunger body 6'. The plunger body 6' comprises the plunger 64 and a skirt 62'. The main body 2' defines the main inner channel 24 and comprises a slide valve 10'. The slide valve 10' comprises an outer slide valve 102' and an inner slide valve 104' arranged radially between the outer slide valve 102' and the plunger 64. Like in the first embodiment, in the closed configuration, the inner slide valve 104' is in the forward position in tight contact with the outer slide valve 102' by means of the seal 106.

Figure 8:
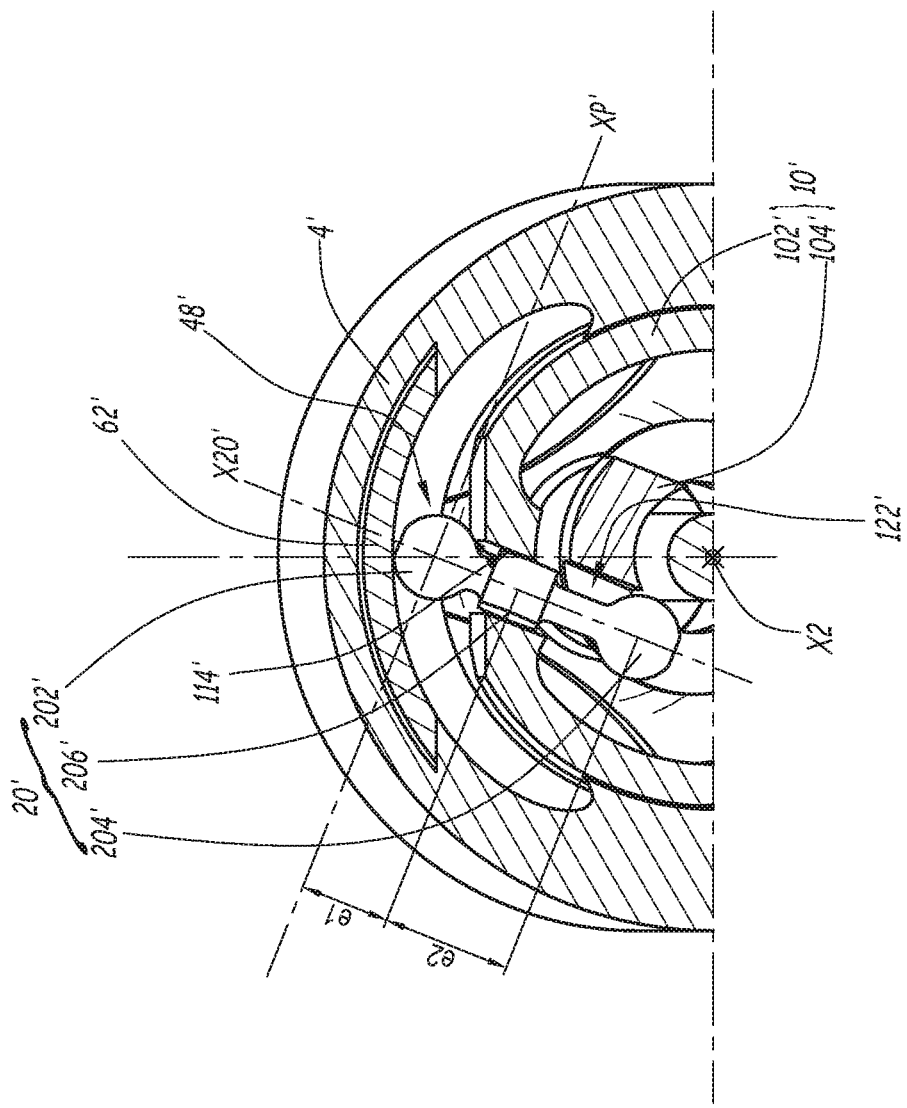
FIG. 8 is a partial sectional view along plane VIII of FIG. 7.

As better shown in FIG. 8, the female element A' comprises three gear reduction members 20', which are asymmetrical. A distance e1 between the center of an outer spherical head 202' and the center of an intermediate body 206' of each gear reduction member 20' is smaller than a distance e2 between the center of an inner spherical head 204' and the center of the intermediate body 206' of each gear reduction member 20', the intermediate body 206' connecting the outer spherical head 202' and the inner spherical head 204'. For example, the distance e2 is of the order of 1.4 times the distance e1, preferably at least 1.25 times the distance e1.

Hereinafter, the assembly and the operation of a single gear reduction member 20' will be described, the assembly and the operation of the other gear reduction members 20' being identical.

The outer spherical head 202' is placed in an inner housing 48' delimited in the front by the outer body 4' and configured so that the outer spherical head 202' continuously abuts in the forward direction against the outer body 4' and in the rear against a front stop surface 63' formed by the skirt 62', to within any functional play. The gear reduction member 20' is therefore continuously engaged with the front stop surface 63' of the outer body 4.

In practice, the inner housing 48' has a section, considered in a longitudinal plane, like in FIG. 7, in the shape of a circle portion, this portion representing more than a semicircle. The center of this section is combined with the center of the outer spherical head 202' through which the pivot axis passes, denoted XP' in FIG. 8, of the gear reduction member 20'.

It should be noted that in this embodiment, an axis X20' of the gear reduction member 20' is not secant with the longitudinal axis X2, unlike the first embodiment. The pivot axis XP' is not orthoradial to the first axis X2, but it is located in a plane orthogonal to the axis X20'. The pivot axis XP' is arranged past the slide valve 10' in a radial direction external to the axis X2.

The intermediate body 206' of the gear reduction member 20' is housed in a longitudinal slot 114' of the outer slide valve 102' and the inner spherical head 204' is housed in an elongate housing 122', arranged in the inner slide valve 104'. As visible in FIG. 8, the longitudinal slot 114' and the housing 122' are aligned along the axis X20'.

In the uncoupled configuration, the gear reduction member 20' is engaged with a front stop surface 126' of the inner slide valve 104', with the front stop surface 63' of the main body 2' but disengaged from the rear stop surface 124' of the outer slide valve 102' while being longitudinally opposite but at a distance from this rear stop surface 124'.

During the coupling phase, the male element B is guided in the female element A' by the mouth 44 in order to align the axis X2 of the main body 2' with the axis X30 of the complementary body 30.

Figure 9:
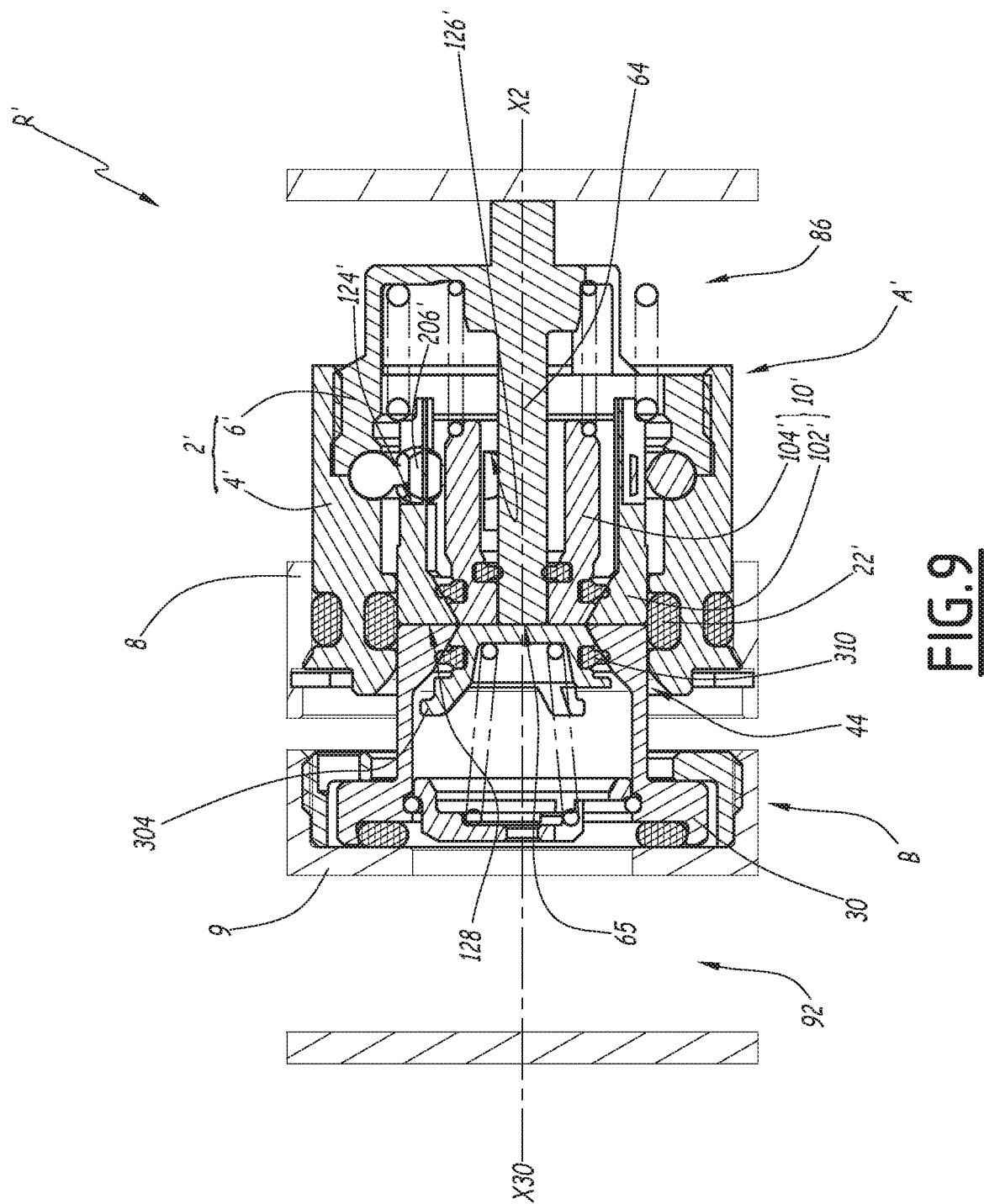
FIG. 9 is a view similar to FIG. 7, illustrating a coupling phase.

In a step illustrated in FIG. 9, the slide valve 10' is pushed back by the complementary body 30. The outer slide valve 102' is driven toward an intermediate position in which the inner slide valve 104' is still in tight contact with the outer slide valve 102'. In this position, the front face 65 of the plunger 64 is still aligned with the front face 128 of the outer slide valve 102'. The complementary body 30 is in contact with the seal 22, which makes it possible to ensure the tightness between the female element A' and the male element B before the opening thereof. In this step, the valve 304 is in the closed off position, that is to say it is in a position such that the seal 310 ensures the tightness between the valve 304 and the complementary body 30.

During the passage from a forward position, like in FIG. 7, to the intermediate position, like in FIG. 9, of the outer slide valve 102', the housing 122' first moves longitudinally in the main body 2' with the outer slide valve 102' while the inner spherical head 204' remains immobile. The inner spherical head 204' is disengaged from the front stop surface 126'. Then the gear reduction member 20' engages with the rear stop surface 124' of the outer slide valve 102', which comes into forward contact with the intermediate body 206' of the gear reduction member 20'. The withdrawal movement of the outer slide valve 102' pivots the gear reduction member 20' around its pivot axis XP' toward the front stop surface 126' of the inner slide valve 104'. When the inner spherical head 204' abuts rearwardly against the front stop surface 126', as illustrated in FIG. 9, the gear reduction member 20' is again engaged with the front stop surface 126'. The outer slide valve 102' is in an intermediate position, in which the complementary body 30 is in tight contact with the main body 2' via the seal 22'. The inner slide valve 104' is in its contact limit position with the outer slide valve 102'. Thus, in certain longitudinal positions of the outer slide valve 102' from the forward position to the intermediate position of the outer slide valve 102', the gear reduction member 20' is disengaged both from the rear stop surface 124' of the outer slide valve 102' and the front stop surface 126' of the inner slide valve 104', while in the other longitudinal positions of the outer slide valve 102' from the forward position to the intermediate position of the outer slide valve 102', the gear reduction member 20' is disengaged only from the front stop surface 126' of the inner slide valve 104'. Irrespective of the longitudinal position of the outer slide valve 102' between the forward position and the intermediate position, the gear reduction member 20' is disengaged from at least one among a front stop surface 63' arranged on the main body 2', a rear stop surface 124' arranged on the outer slide valve 102' and a front stop surface 126' arranged on the inner slide valve 104' and the inner slide valve 104' is kept in tight contact with the outer slide valve 102'.

Figure 10:
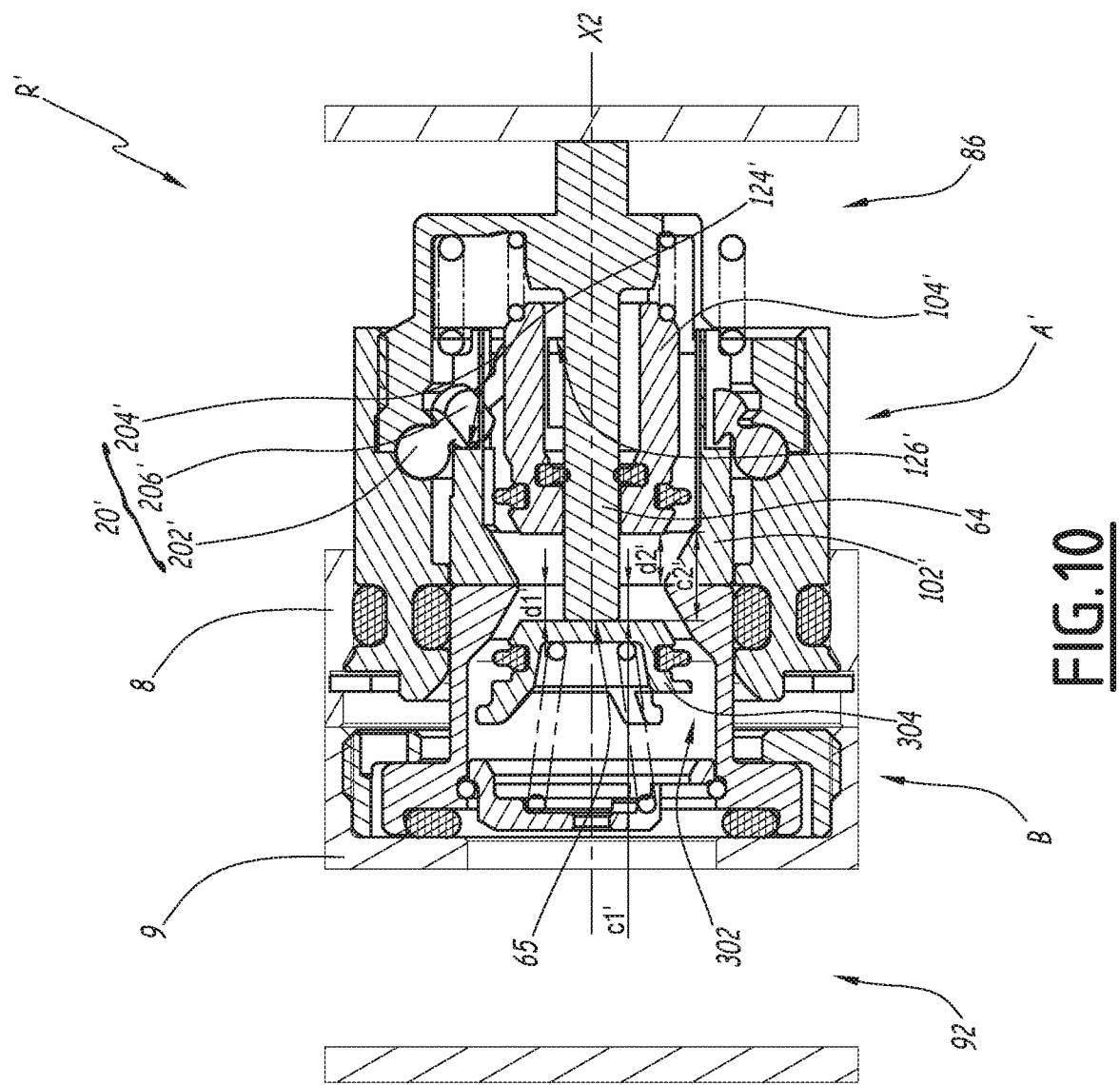
FIG. 10 is a view similar to FIG. 7, illustrating a coupled configuration.

Next, in a step that leads to the configuration of FIG. 10, the complementary body 30 is inserted into the female element A' along a rear direction defined by the female element A' until the supports 8 and 9 are in contact. The intermediate body 206' is still in contact with the rear stop surface 124' of the outer slide valve 102' and the inner spherical head 204' is in contact with the front stop surface 126' of the inner slide valve 104'. The intermediate body 206' being pushed back by the outer slide valve 102', the gear reduction member 20' pivots about its pivot axis XP'. Thus, the complementary body 206' is located behind the outer spherical head 202' and the inner spherical head 204' is located behind the intermediate body 206', and therefore the outer spherical head 202'.

Thus, given the configuration of the points of contact between the gear reduction member 20' and the inner slide valve 102', respectively the outer slide valve 104', relative to the pivot axis XP', the inner slide valve 104' is pushed back in its offset rear position, where it is separated from the outer slide valve 102', leaving a passage for the fluid between the inner slide valve 104' and the outer slide valve 102'. Given the asymmetry of the gear reduction member 20', a longitudinal travel c2', relative to the main body 2', of the inner slide valve 104' between its contact limit position with the outer slide valve 102' and an offset position, when the female element A is in the coupled configuration with the male element B, is at least 2.5 times greater than a longitudinal travel c1', relative to the main body 2', of the outer slide valve 102' between its intermediate position and its withdrawn position in the coupled configuration.

Like in the first embodiment, in parallel, the front face 65 of the plunger 64 comes back into contact with the valve 304 in order to push it back toward its separated position, in order to allow the fluid to pass between the complementary inner channel 302 and the main inner channel 24.

The incline of the pivot axis XP' and the asymmetry of the gear reduction member 20' make it possible to have a longitudinal distance d1' traveled by the valve 304 relative to the complementary body 30 between its closed off position and its separated position in the coupled configuration that is smaller than a longitudinal offset distance d2' of the inner slide valve 104' relative to the outer slide valve 102' traveled by the inner slide valve 104' between its intermediate position and its offset position in the coupled configuration.

The aforementioned lip seals can comprise one or several lips.

The aforementioned variants relate to both of the embodiments described above.

In a variant, the female element A or A' comprises a different number of gear reduction members 20 or 20', for example one, two, four or six. In this case, the female element A or A' comprises a corresponding number of inner housings 48 or 48', longitudinal slots 114 or 114' and housings 122 or 122'.

In a variant, the respective diameters of the outer spherical head 202 or 202' and the inner spherical head 204 or 204' of each gear reduction member are different.

According to another variant, the outer head 202 or 202' of each gear reduction member 20 or 20' is not spherical. For example, it is cylindrical.

In a variant, the tightness between the inner slide valve 104 or 104' and the outer slide valve 102 or 102' in the closed configuration is a radial tightness. In other words, in the closed configuration of the slide valve 10 or 10', a seal is inserted between an outer radial surface of the inner slide valve 104 or 104' and an inner radial surface of the outer slide valve 102 or 102' and the inner slide valve 104 or 104' does not abut longitudinally against the outer slide valve 102 or 102' by means of the seal.

In a variant, the outer slide valve 102 or 102' does not have a longitudinal slot 114 or 114' and the rear stop surface 124 or 124' of the outer slide valve 102 or 102' is arranged at a rear face of the outer slide valve 102 or 102'.

In a variant, each gear reduction member 20 can be a lever with two branches, one extending from an outer head on one side of the longitudinal axis X2 in order to cooperate with the outer slide valve 102 and the other extending from the outer head past the axis X2 in order to cooperate with the inner slide valve 104. In this case, the pivot axis of each gear reduction member 20 is arranged past the inner 104 and outer 102 slide valves in a radial direction external to the central axis X2.

In a variant, the given relative position between the supports 8 and 9 reached during the third step of the coupling phase can be defined as a non-nil distance between the supports 8 and 9, for example 2 mm.

The invention claimed is:

1. A fluid coupling comprising a female element and a male element able to be inserted into the female element, the female element comprising:
   a main body defining a main inner channel, which extends along a longitudinal central axis, and comprising a fixed central plunger; and
   a slide valve, movable longitudinally in the main inner channel around the plunger between a closed configuration and an open configuration of the main inner channel,
and the male element comprising:
   a complementary body defining a complementary inner channel; and
   a valve movable in the complementary inner channel between a closed off position of the complementary inner channel, in which a first seal ensures the tightness between the valve and the complementary body, and a separated position, in which the valve no longer closes off the complementary inner channel,
wherein
   in an uncoupled configuration of the fluid coupling, the slide valve is in the closed configuration and cooperates radially tightly with the main body by means of a second seal housed in an inner groove of the main body, while the valve is in the closed position,
   in a coupled configuration of the fluid coupling, the valve is pushed back in the separated position by the plunger while the complementary body cooperates with the slide valve, which is in the open configuration,
wherein the slide valve comprises an outer slide valve and an inner slide valve, which are movable relative to one another, the slide valve being such that:
   in the closed configuration, the second seal cooperates with the outer slide valve, which is in a forward position, and the inner slide valve is in a forward position in which the inner slide valve is in tight contact with the outer slide valve and with the plunger; and
   in the open configuration, the outer slide valve is in a withdrawn position and the inner slide valve is in an offset position relative to the outer slide valve, such that a passage for a fluid exists between the outer slide valve and the inner slide valve,
wherein a first spring is inserted between the inner slide valve and the main body in order to push the inner slide valve back toward its forward position, and wherein the female element comprises at least one elongate lever, the at least one elongate lever being such that, during a coupling phase of the female and male elements to transition the fluid coupling from the uncoupled configuration to the coupled configuration:
   irrespective of the longitudinal position of the outer slide valve between the forward position and an intermediate position, in which the complementary body cooperates tightly with the second seal, the at least one elongate lever is disengaged from at least one among a front stop surface arranged on the main body, a rear stop surface arranged on the outer slide valve and a front stop surface arranged on the inner slide valve, the inner slide valve being kept in tight contact with the outer slide valve and with the plunger, and
   from the intermediate position to the withdrawn position of the outer slide valve, the at least one elongate lever is engaged with the front stop surface of the main body, with the rear stop surface of the outer slide valve and with the front stop surface of the inner slide valve, the at least one elongate lever moving the inner slide valve toward its offset position relative to the outer slide valve.

2. The fluid coupling according to claim 1, wherein, from the intermediate position to the withdrawn position of the outer slide valve, which the outer slide valve adopts in the coupled configuration of the fluid coupling:
   the inner slide valve is moved toward the rear relative to the outer slide valve,
   a longitudinal travel of the inner slide valve relative to the main body is at least 1.5 times greater than a longitudinal travel of the outer slide valve relative to the main body.

3. The fluid coupling according to claim 1, wherein, from the forward position to the intermediate position of the outer slide valve, the at least one elongate lever is disengaged from the front stop surface arranged on the main body and is translatable longitudinally in the main body.

4. The fluid coupling according to claim 1, wherein a second spring is inserted between the outer slide valve and the main body, pushing the outer slide valve back toward its forward position.

5. The fluid coupling according to claim 4, wherein a resilient force of the second spring is greater than a resilient force of the first spring.

6. The fluid coupling according to claim 1, wherein the at least one elongate lever is a lever that, from the intermediate position to the withdrawn position of the outer slide valve, pivots in the main body about an axis located in a plane orthogonal to the longitudinal central axis.

7. The fluid coupling according to claim 6, wherein, along a direction radial to the longitudinal central axis, the rear stop surface of the outer slide valve is arranged on the same side, relative to the front stop surface of the main body, as the front stop surface of the inner slide valve.

8. The fluid coupling according to claim 6, wherein the lever comprises an outer head and an inner head, arranged radially on either side of an intermediate connecting body, the outer head being engaged in an inner housing of the main body delimited longitudinally by the front stop surface of the main body and the inner head being engaged in a housing of the inner slide valve delimited longitudinally by the front stop surface of the inner slide valve, the intermediate body being able to come into contact against the rear stop surface of the outer slide valve.

9. The fluid coupling according to claim 8, wherein the outer head and the inner head of the lever are spherical.

10. The fluid coupling according to claim 6, wherein, in the uncoupled configuration of the fluid coupling, the lever is inclined relative to the orthogonal plane and the outer head is behind the inner head, and wherein, in the coupled configuration of the fluid coupling, the lever is inclined relative to the orthogonal plane and the outer head is in front of the inner head.

11. The fluid coupling according to claim 1, wherein the at least one elongate lever is able to abut, in a direction radial to the longitudinal central axis, against a connecting surface arranged on the outer slide valve and, in an opposite radial direction, against the main body.

12. The fluid coupling according to claim 1, wherein the at least one elongate lever is mounted, without possibility of relative longitudinal movement, in a housing of the inner slide valve delimited longitudinally by the front stop surface.

13. The fluid coupling according to claim 1, wherein, in the uncoupled configuration of the fluid coupling, a front face of the plunger, able to come into contact with the valve of the male element in order to push it back into the separated position, is offset toward the rear relative to a front face of the outer slide valve by a distance equal to a longitudinal distance traveled by the outer slide valve relative to the main body from its forward position to its intermediate position.

14. The fluid coupling according to claim 1, wherein a third lip seal provides the tightness between the inner slide valve and the outer slide valve in the closed configuration of the slide valve.

15. The fluid coupling according to claim 14, wherein the first seal and the third seal have an identical geometry.

16. The fluid coupling according to claim 1, wherein the complementary body is mounted on a complementary support with the possibility of relative clearance perpendicular to a longitudinal axis defined by the complementary body.

* * * * *